United States Patent [19]

Arnett

[11] Patent Number: 4,873,851
[45] Date of Patent: Oct. 17, 1989

[54] SPARE TIRE LOCK FOR TRUCK-TRAILER WHEELS

[76] Inventor: Daniel W. Arnett, 8206 N. 122nd E. Ave., Owasso, Okla. 74055

[21] Appl. No.: 325,951

[22] Filed: Mar. 20, 1989

[51] Int. Cl.⁴ .............................................. E05B 65/12
[52] U.S. Cl. .......................................... 70/259; 70/56
[58] Field of Search ...................... 70/259, 260, 54, 55, 70/56; 224/42.06, 42.25, 42.24

[56] References Cited

U.S. PATENT DOCUMENTS

| | | | |
|---|---|---|---|
| 3,884,057 | 5/1975 | Maurer | 70/259 |
| 3,940,959 | 3/1976 | Anderson | 70/259 |
| 4,007,863 | 2/1977 | Norris | 70/259 |
| 4,076,158 | 2/1978 | Barr | 70/259 |
| 4,225,066 | 9/1980 | Barr | 70/259 |
| 4,294,088 | 10/1981 | Barr | 70/56 |
| 4,416,402 | 11/1983 | Matthew | 224/42.25 |
| 4,765,164 | 8/1988 | Prince | 70/259 |

*Primary Examiner*—Robert L. Wolfe
*Attorney, Agent, or Firm*—William S. Dorman

[57] ABSTRACT

A spare tire locking device for truck-trailer wheels and the like vehicles and for use in association with a conventional tire carrier mounted on the underside of the vehicle, comprising a generally gull-shaped member having a pair of upper and outwardly extending horizontal arms adapted to overlie the rim portion only of the wheel, a lower flat central portion connecting with the inner ends of the horizontal arms through a pair of upright members, a stud projecting downwardly from each horizontal arm, the studs being receivable in diametrically opposite bolt holes in the rim for bolting the gull-shaped member against the rim with the central portion and upright member being received in the pre-existing central opening in the rim, a hollow cylinder attached to the upper surface of the flat central portion, a smaller cylindrical tube attached to the upperside of the flat central portion in concentric relation with the cylinder and communicating with the cylinder through a hole in the central portion, and a T-bar having a vertical portion adapted to pass first through a pre-bored hole in the conventional tire carrier on which the wheel is mounted with the gull-shaped member attached thereto, the T-bar being adapted to pass upwardly through the tube and into the interior of the cylinder, the T-bar having a horizontal handle connected to the lower end of the vertical portion and a hole at the upper end of the vertical portion for attachment of a padlock to the vertical portion when it projects upwardly into the cylinder.

4 Claims, 3 Drawing Sheets

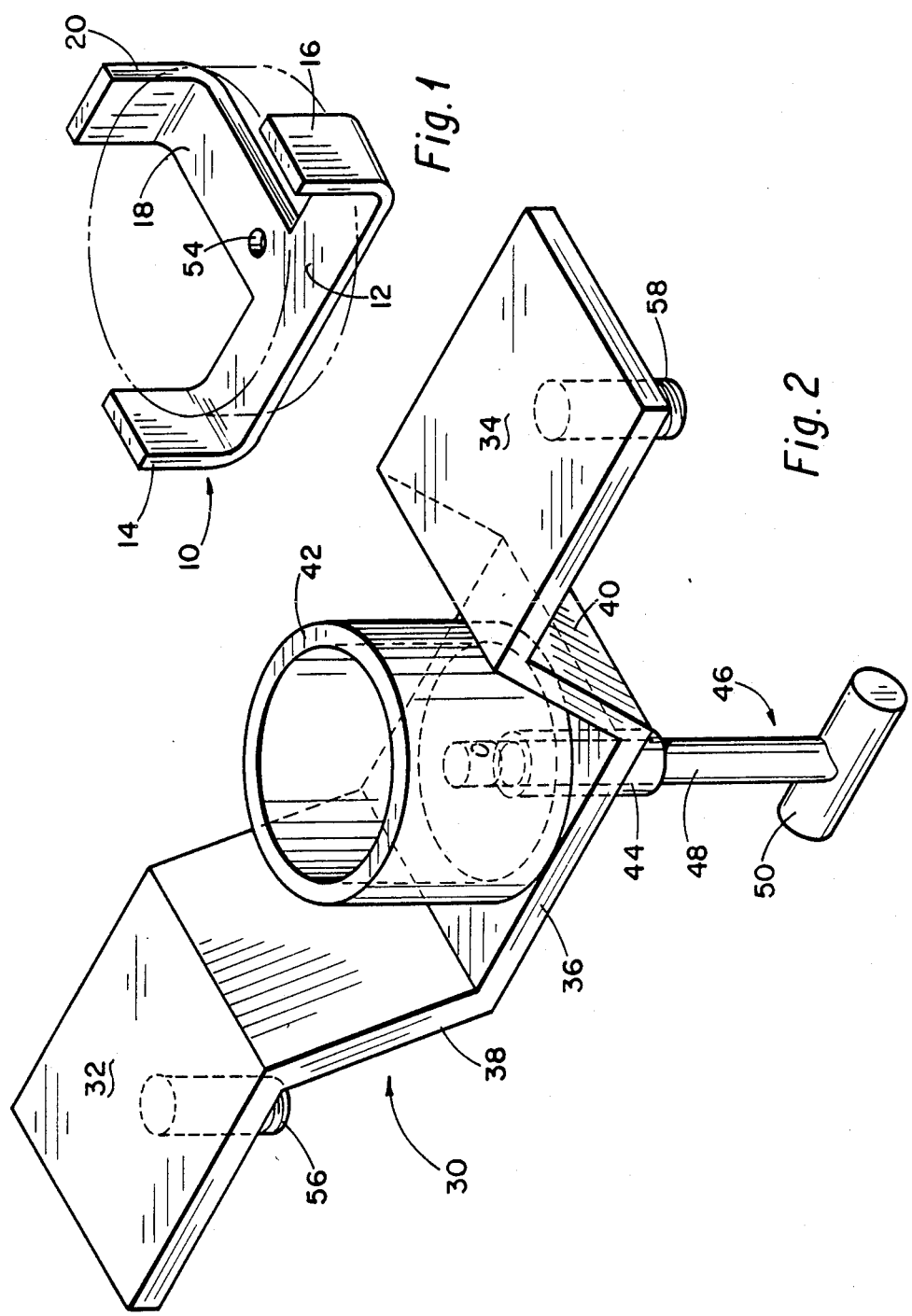

SPARE TIRE LOCK FOR TRUCK-TRAILER WHEELS

BACKGROUND OF THE INVENTION

1. Field of the Invention

The present invention relates to a device, a spare truck wheel with tire mounted thereon, under a truck-trailer using the conventional wheel support. More particularly, the present invention is designed for the "Bud" wheel which represents about 75% of the wheels or rims currently used by truckers.

2. The Prior Art

Heavy trucks, trailers therefor and similar vehicles are generally equipped with a spare tire mounting bracket for storing a spare tire against the undercarriage of the vehicle, typically near the rear portion of the vehicle. The spare tire is frequently secured to the bracket by means of a steel cable or chain which can be wrapped around the tire and the bracket, and the ends of the chain can be secured by means of a padlock. However, with a pair of bolt cutters, a thief can readily remove the spare tire from the mounting bracket.

A preliminary search was conducted on the invention disclosed herein, and the following U.S. patents were uncovered in the search:

| U.S. Pat. No. | Patentee | Date |
| --- | --- | --- |
| 3,431,756 | Fennell | 3-11-69 |
| 3,884,057 | Maurer | 5-20-75 |
| 3,918,764 | Lamme | 11-11-75 |
| 3,940,959 | Anderson et al. | 3-02-76 |
| 4,122,693 | Barr | 10-31-78 |
| 4,282,995 | Austin | 8-11-81 |
| 4,765,164 | Prince, Jr. | 8-23-88 |

The closest patent uncovered is Anderson et al., which uses a similar "gull-shaped" holding plate as shown in FIG. 6. However, this holding plate does not include a center cylinder nor does it include studs which go into the holes of the "Bud" rim. The Anderson patent has a stationary stud in the middle of the spare tire rack which the tire slips over. Also, on the Anderson patent you have to invert the wheel to lock it into place. This would result in rubbing and scarring of the attractive chrome on the wheel.

SUMMARY OF THE INVENTION

A spare tire locking device for truck trailer wheels, especially those wheels having rims of the "Bud" type or similar design, comprising a generally gull-shaped member or plate having a pair of upper and outwardly extending horizontal arms or wings connected with a lower flat central portion or plate through a pair of upright members or plates, a stud projecting downwardly from each horizontal arm, the studs being receivable in diametrically opposite bolt holes in a "Bud" rim for bolting against the rim with the central portion of the locking device being received in the central opening in the rim, a hollow cylinder attached to the upper surface of the flat central portion, a smaller cylindrical tube attached to the underside of the flat vertical plate in concentric relation with the cylinder and communicating with the cylinder through a hole in the flat central portion, and a T-bar having a vertical portion adapted to pass first through a pre-bored hole in a conventional tire carrier on which the "Bud" wheel is mounted with above locking device bolted thereto and then to pass upwardly through the cylindrical tube and into the interior of the cylinder, the T-bar having a horizontal handle connected to the lower end of the vertical portion and a hole at the upper end of the vertical portion for attachment of a padlock to the vertical portion when it projects upwardly into the cylinder.

BRIEF DESCRIPTION OF THE DRAWINGS

FIG. 1 is a perspective view of a conventional tire carrier which is secured to the undercarriage of a truck-trailer or the like;

FIG. 2 is a perspective view of the device of the present invention;

DETAILED DESCRIPTION OF THE PREFERRED EMBODIMENTS

Figure 3:
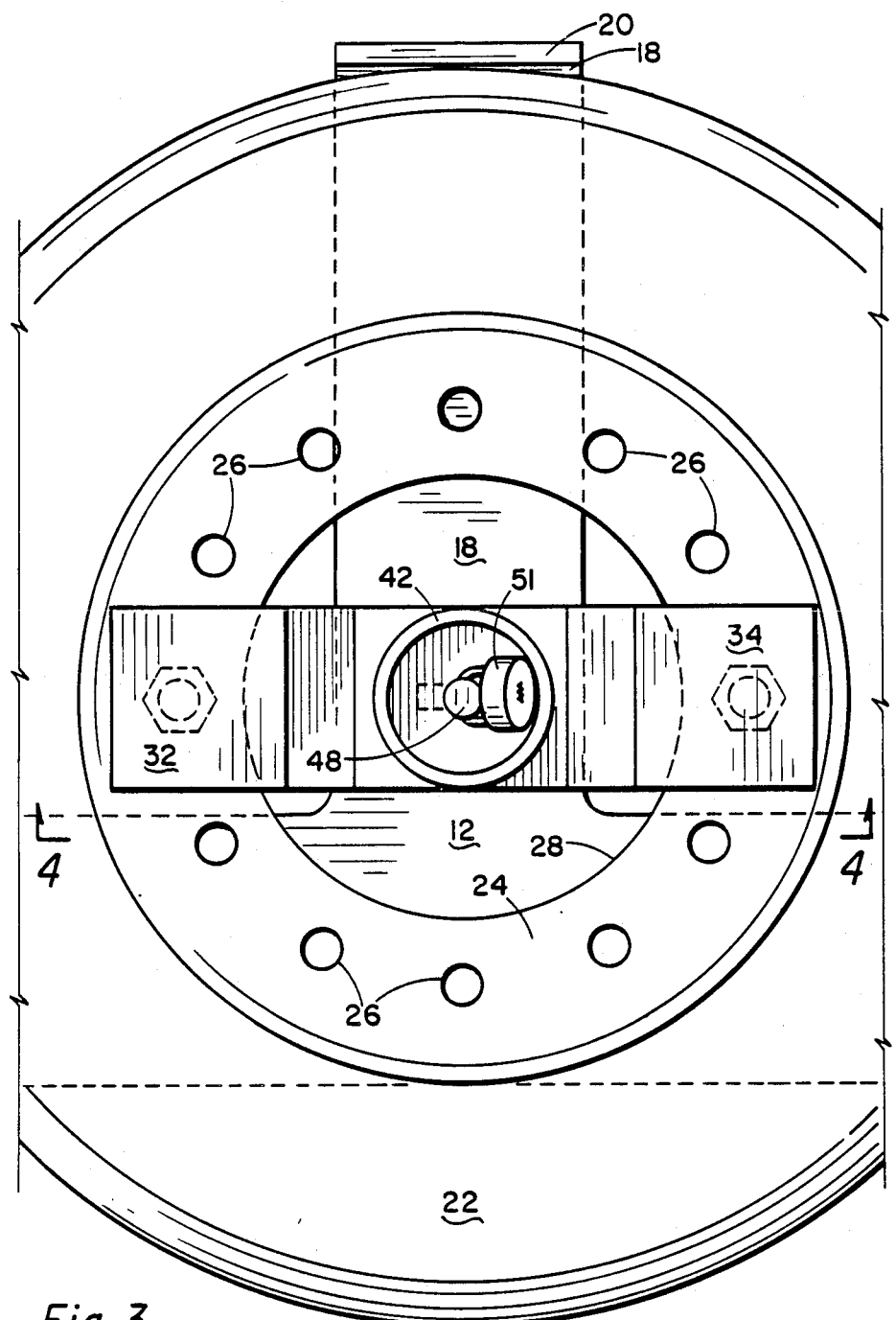
FIG. 3 is a plan view showing the device for the present invention securing a wheel of the "Bud" type to the tire carrier of FIG. 1.

FIG. 1 shows a conventional tire support or carrier 10 which would face outwardly from the rear or side of a truck-trailer. This support includes a horizontal member 12 whose length is at least equal to the maximum diameter of a mounted tire which is to be supported on the carrier. The outer ends of the horizontal member attach to vertical side members 14 and 16 whose upper ends are welded to the frame (not shown) of a truck-trailer (not shown). Another horizontal member 18 attaches to and extends at right angles to the horizontal member 12 and is provided with a vertical side member 20 whose upper end is also welded to the frame of the truck-trailer. The horizontal member 18 is sufficiently long so that the tire support 10 can support a tire (not shown) such that the majority of the tire would be resting on the members 12 and 18 with only a portion of the tire projecting out from the support. Normally, the trucker will secure the tire to the support 10 by means of a chain (not shown) which he will pass through the center of the rim and around the support and then secure the ends of the chain together with a padlock. However, as indicated heretofore, it is a common practice for thieves to steel these tires by using bolt cutters on the chains or locks. The tires and wheels together are worth from $400 to $600 each.

FIG. 3 shows a tire 22 mounted on a "Bud" rim 24. The rim is provided with a plurality of holes 26 and a central opening 28. Although the present invention has been designed for use and in conjunction with "Bud" rims, obviously it could be modified "dimensionally" for other rims. Also, since the "Bud" rim comes in several different sizes, the device of the present invention can be dimensioned for any size of "Bud" rim.

Figure 4:
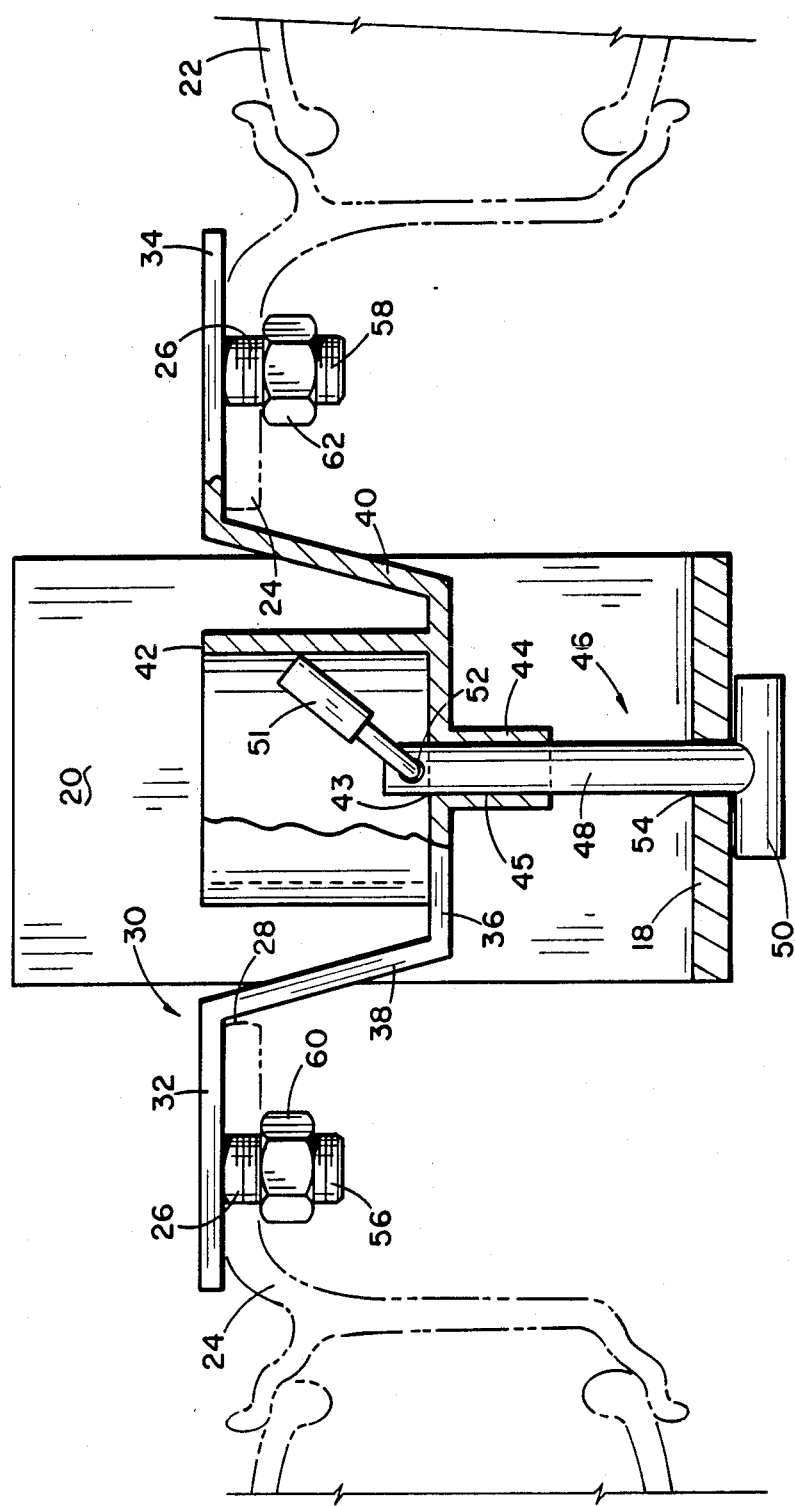
FIG. 4 is a sectional view taken along section line 4—4 of FIG. 3, and showing a partial section of the device of the present invention.

Referring now to FIGS. 2 and 4, the locking device 30 of the present invention consists of a piece of heavy gauge steel plate which has been bent in a "gull" shape so as to form a pair of upper horizontal arms or wings 32 and 34. A lower flat central portion or plate 36 connects with a pair of vertical or inclined members or plates 38 and 40 which connect from the ends of the bottom horizontal member 36 to the inner ends of the two horizontal arms 32 and 34 respectively. A hollow cylindrical member 42 is welded to the upper surface of the flat center portion 36. A smaller cylindrical member or tube 44 is welded to the under side of the flat vertical plate 36 in concentric relation with the cylinder 42. The plate 36 is provided with a hole 43 which is in allignment with the bore 45 of the tube 44. A T-bar 46 having a vertical portion 48 and a horizontal handle portion 50 attached to the member 48 is the final part of locking device except for a conventional padlock 51 which can be inserted through a hole 52 located at the upper end of the vertical arm 48. In order to utilize the present locking device, a hole 54 must be drilled in the member 18 of the tire support 10 shown in FIG. 1. The hole 54 must be at least as large as the outer diameter of the vertical arm 48 and should be essentially the same as the diameter of the hole 43 and the bore 45 in the tube 44.

The arms 32 and 34 are provided with vertical studs 56 and 58, respectively, which are adapted to be received in the holes 26 of the "Bud" rim 24. The center portion of the device 30 is adapted to fit into the opening 28 in the rim. That is, the center portion 36 and the two upright members 38 and 40 will fit down into the opening 28 while the studs 56 and 58 will pass through diametrically opposite holes 26. The member 30 will be installed on the rim 24 before the tire is put into the carrier 10. When the device 30 is placed on the rim 24, nuts 60 and 62 are screwed onto the lower ends of the studs 56 and 58, respectively. Now, the tire 22 with rim 24 and locking device 30 attached are slipped into the carrier 10 until the tube 44 is positioned above the hole 54. At this point, the T-bar 46 is inserted through the hole 54 up to the tube 44 and into the center of the cylinder 44. The upper end of the arm 48 projects upwardly into the cylinder 42 just enough so that a padlock 51 can be inserted through the hole 52 in the arm 48. Now the tire is securely locked in place. It is virtually impossible for anyone to insert a pair of bolt cutters under the trailer and into the interior of the cylinder 42 to cut the padlock.

Whereas the present invention has been described in particular relation to the drawings attached hereto, it should be understood that the other and further modifications, apart from those shown or suggested herein, may be made within the spirit and scope of this invention.

What is claimed is:

1. A spare tire locking device for truck-trailer wheels and the like vehicles and for use in association with a conventional tire carrier of the type having a first horizontal member whose length is at least equal to the maximum diameter of the wheel and tire to be supported thereon, the carrier having vertical side members extending upwardly from the ends of the first horizontal member and welded at their upper ends to the frame of the vehicle and the carrier having a second horizontal member attached to and extending from the center of the first horizontal member at right angles thereto, the length of the second horizontal member being such that a majority of the wheel and tire will be supported on the carrier with only a portion of the tire projecting outwardly therefrom, the second horizontal member being provided with a vertical side member connected to the outer end of the second horizontal member and being welded at its upper end to the frame of the vehicle; the spare tire locking device comprising a generally gull-shaped member having a pair of upper and outwardly extending horizontal arms adapted to overlie a rim portion only of the wheel, a lower flat central portion connecting with the inner ends of the horizontal arms through a pair of upright members, a stud projecting downwardly from each horizontal arm, the studs being receivable in diametrically opposite bolt holes in the rim for bolting the gull-shaped member against the rim with the central portion and upright member being received in a pre-existing central opening in the rim, a hollow cylinder attached to the upper surface of the flat central portion, a smaller cylindrical tube attached to the upperside of the flat central portion in concentric relation with the cylinder and communicating with the cylinder through a hole in the central portion, and a T-bar having a vertical portion adapted to pass first through a pre-bored hole in the conventional tire carrier on which the wheel is mounted with the gull-shaped member attached thereto, the T-bar being adapted to pass upwardly through the tube and into the interior of the cylinder, the T-bar having a horizontal handle connected to the lower end of the vertical portion and a hole at the upper end of the vertical portion for attachment of a padlock to the vertical portion when it projects upwardly into the cylinder.

2. A spare tire locking device as set forth in claim 1 wherein the studs are spaced apart at a distance equal to the distance between diametrically opposite holes in a "Bud" rim.

3. A spare tire locking device as set forth in claim 1 wherein the upright members are vertical.

4. A spare tire locking device as set forth in claim 1 wherein the upright members are inclined.

* * * * *